Aug. 7, 1962      E. W. SMITH      3,048,226
USE OF PULSATING PRESSURES FOR INCREASING THE
PERMEABILITY OF UNDERGROUND STRUCTURES
Filed April 4, 1955

INVENTOR.
EDWARD W. SMITH
BY
EZEKIEL WOLF
HIS ATTORNEY he# United States Patent Office 3,048,226
Patented Aug. 7, 1962

3,048,226
USE OF PULSATING PRESSURES FOR INCREASING THE PERMEABILITY OF UNDERGROUND STRUCTURES
Edward W. Smith, 47 Lovell Road, Melrose Highlands, Mass.
Filed Apr. 4, 1955, Ser. No. 498,836
9 Claims. (Cl. 166—42)

The present invention relates to the problem of increasing the permeability of underground formations containing liquids such as oil or water, and to a method and means for increasing the flow of liquids through such formations.

In one commonly used method for accomplishing this purpose in oil-bearing formations, a fluid or gel-like material containing a special type of sand is pumped down through tubing into the well to be treated and is then forced under pressure into the formation in question. In so doing the hydrostatic pressure from the column of fluid or sand-bearing gel in the tubing, plus the pressure exerted by the pump, forces it into incipient crevices in the formation, opening them slightly and allowing the fluid or sand-bearing gel to penetrate into the formation to a distance depending upon the pressures applied, the resistance of the formation and some other factors. Incorporated with the fluid, gel or other semi-viscous material used to keep sand particles in suspension until they are carried out into the formation via the crevices just mentioned, may be a relatively slow acting "breaking" agent. Thus, after the sand particles have been located in the desired position where they will in effect prop up the formation and keep the crevices relatively open, this agent causes the supporting fluid or gel, to break and drain away as a relatively thin liquid, allowing the desired oil thereafter to flow more readily through the now more permeable formation.

Depending, of course upon the depth of the well and the type of formation encountered, the pressure required may be several thousand pounds per square inch, or in other cases may be much more moderate values.

Since the pressures required are supplied by mobile pumping equipment, a combination of a deep well and a resistant formation may well involve pressures which are difficult for such equipment to supply. Furthermore, it seems probable that the sand-bearing gel moves, under the pressures used, into the first fissure to open under such treatment and progressively widen it rather than to open up a number of similar fissures which may be somewhat more resistant than the one where the initial break occurs.

One of the purposes of the present invention is to provide a method and means whereby high pulsating hydrostatic pressures may be developed and exerted against the formation to be treated.

Another object of the invention is to reduce the size of the mobile pumping equipment normally necessary for this work.

Another purpose of the invention is to make it possible to combine the above mentioned pulsating pressure with a static pressure, if so desired, so that the pressure applied against the formation may pulsate above and below some predetermined static value.

A further object of the present invention is to operate the liquid column in the well or structure at a resonance so that the pressure at the base of the well may be built up to many times the pressure at the top of the well. For this purpose the column may be established at a one-quarter of a wave length or some half wave length addition thereof such as a three quarter wave length column whereby the pressure at the base of the well structure may be greatly increased.

The method by which the desired high pulsating hydrostatic pressures may be developed at the bottom of the hole in the wells to which the invention is applied, will best be understood from the specification below taken in connection with the diagrams and drawings in which: FIGURE 1 illustrates diagrammatically a shaft or column as applied theoretically to the present invention. FIGURES 2 and 3 illustrates the application of pulsating compressional waves in establishing resonance in a quarter wave length well column structure.

Figure 1:
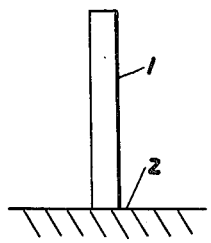

The method by which high pulsating hydrostatic pressures may be developed at the bottom of the hole in the present invention can best be understood by reference to FIGURE 1 where 1 is a shaft or rod, let us say, of steel, solidly secured at the bottom to a base structure 2. If now, this shaft is struck a blow on its end, the rod will vibrate vertically at an amplitude which is determined by the strength of the blow, and at a frequency which is determined by its length and the velocity of sound or compressional wave travel in the material.

These factors are connected by the relationship $$f\lambda = c$$

where $f$ is the frequency of vibration in cycles per second, $\lambda$ the wave length and $c$ is the velocity of transmission of a compressional wave in the material involved.

Figure 2:
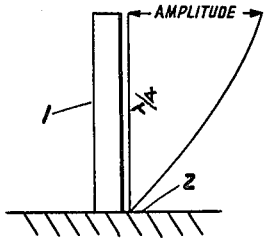

Since rod 1 is securely fastened at one end to structure 2 and free at its upper end, the impact of blow will cause a momentary compression of the rod and as the rod starts to vibrate longitudinally, the amplitude of motion at any point along its length will be sinusoidal, i.e. the amplitude will obviously be zero at the point where it is secured to structure 2 and will increase sinusoidally to a maximum at its free end as depicted in FIGURE 2.

The length of rod 1 constitutes what is known as a quarter wavelength, i.e. ¼ of a complete sinusoidal cycle of vibration. Thus if the rod 1 is made 10 feet long, and of steel, in which the velocity of travel of a compressional wave is about 16,000 feet per second, the frequency of vibration, substituting in the above equation will be $$f(4)(10) = 16,000$$

or $$f = 400 \text{ cycles/second}$$

While it is obvious that the vibration of a steel rod set in oscillation by a single impact, as mentioned above, would eventually die out due to internal losses in the rod itself, it is equally obvious that if we apply a series of impacts to the rod at its natural period of vibration, i.e. 400 times per second, each impact supplying sufficient energy to make up for the internal losses per cycle, then the rod would vibrate indefinitely at this frequency.

While mention has been made up to now of the amplitude of motion of various parts on the rod varying sinusoidally the same thing occurs with regard to the pressure required at various points along the rod to maintain the oscillation except that it occurs in the opposite sign, i.e. the pressure is a maximum at the point where rod 1 is secured to structure 2 and a minimum at the top of rod 1.

Figure 3:
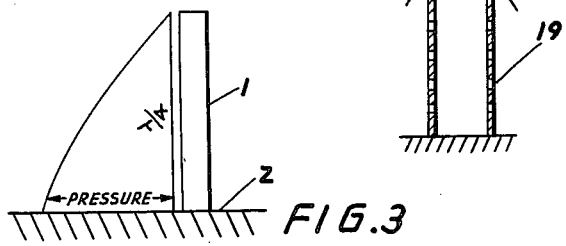

The situation as regards the pressure is depicted in FIGURE 3. In other words, at the instant when the upper end of the rod is moving at its maximum velocity in the upward direction corresponding to the instant when the upper end of the rod is moving through its normal position at rest, the bottom of the rod 1 is exerting a maximum pressure against structure 2. Similarly when the top of the rod has started downward and is passing through its position of rest again in the downward direction, a minimum pressure is exerted against structure 2 by the bottom end of rod 1. This rise and fall of the top of the rod and the corresponding rise and fall in the pressure exerted by rod 1 on structure 2 continues as long as rod 1 is in oscillation, and, as before mentioned, at a frequency dependent upon the length of rod 1 and the velocity of sound or compressional wave travel in the material.

An extremely interesting sidelight on the vibration of such a column in the axial direction, lies in the fact that the pressure pulses at the top of the rod which are required to maintain the column in oscillation need be no greater than the amount needed to supply the energy losses in the column during oscillation such as internal friction and the like at a given amplitude of oscillation and consequently may be, and usually are, many times less than the corresponding pressure at the bottom where rod 1 is secured to structure 2. For example, it is easily possible to have alternating pressures exerted at the bottom which are ten times as great as the pulsating pressures at the top which are required to maintain the oscillation.

Figure 4:
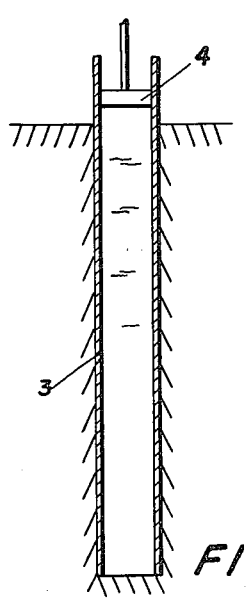
FIGURE 4 shows the application to a liquid filled casing column.

While it is less generally realized, an enclosed liquid column can be made to oscillate in the same way as the rod which has just been discussed. Consider for example, the situation shown in FIGURE 4, where we have a liquid filled steel tube or casing 3 extending downward into the earth and fitted at the top with a piston 4 in contact with the top of the liquid column. Here again we have an exactly analagous situation to the one depicted in FIGURES 1, 2 and 3.

In this case, assuming the column to be filled with water, the velocity of transmission of a compressional wave pulse through it will be much less than in steel, approximately 4300 feet per second, and assuming the column to be 1000 feet long, then from our previously mentioned equation the frequency of vibration of the column vibrating as a ¼ wavelength oscillator will be $$f(4)(1000)=4300$$

or $$f=1.083 \text{ cycles/second}$$
$$=53.3 \text{ cycles/minute}$$

Thus if a pulse of pressure is applied 53.3 times per minute to the top of the liquid column, the column will oscillate vertically at this frequency and at an amplitude which is such that the friction and internal losses brought about by it will equal the power introduced each cycle by the piston. For this reason, once the characteristics of a given liquid column are known, the amplitude of oscillation of the piston can be used as a measure of the alternating pressure being built up at the bottom of the column.

Figure 5:
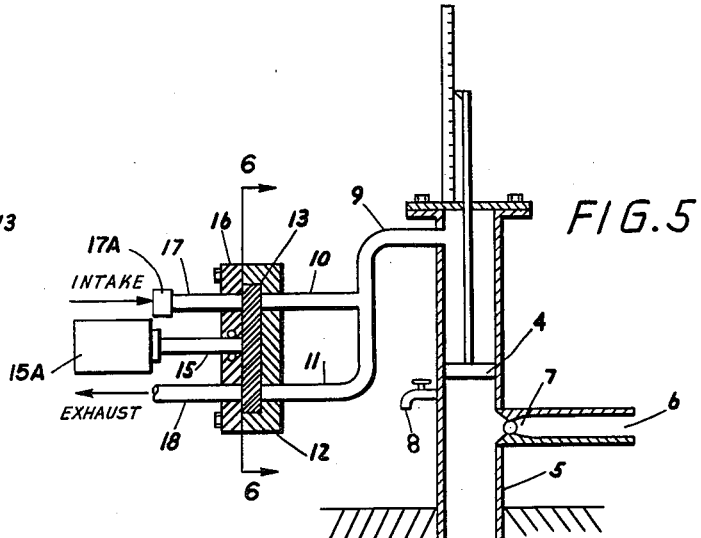
FIGURE 5 shows diagrammatically a complete operating system according to the present invention.

A concrete example of how the principles hereinbefore discussed can be applied to the problem of underground fracturing can best be understood from an examination of FIGURE 5. Here, it will be noted, we have a casing 5 going down to the formation. After the column has been filled with the liquid containing sand through opening 6 and check valve 7, the piston 4 is pushed down to bring it in contact with the top of the column which action may be facilitated by bleeding off through petcock 8, any air which may have become trapped between the column and the piston in the process of filling the column.

Figure 6:
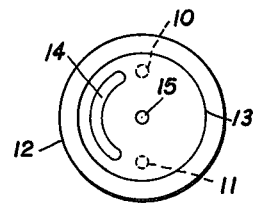
FIGURE 6 shows a section on the line 6—6 of FIGURE 5.

It will also be noted that the space behind the piston is connected through a pipe 9 to two pipes 10 and 11 and from thence to the keying device 12. Within the device 12 is a rotor 13 having an arcuate opening 14 (see FIGURE 6) through it which is adapted to rotate within the device 12. The shaft 15 on which the rotor is mounted is itself supported by plate 16. An intake pipe 17 and an exhaust pipe 18 are provided through the plate 16 opposite the openings of pipes 10 and 11 so as to permit a clear passage through when the position of the rotor permits.

Let us now suppose that the rotor 13 is turned to a position where the arcuate slot 14 through it will permit, let us say, water to be introduced through intake pipe 17, through plate 16, and slot 14 in rotor 13, through pipes 10 and 9 into the chamber behind piston 4, filling it completely and forcing the piston downward. Let us now suppose that intake pipe 17 is connected to a source of water pressure and rotor 13 is rotated via shaft 15 and a suitable variable speed motor, 15a. It will be noted that arcuate slot 14 in rotor 13 is so constructed that as rotor 13 is revolved it will connect intake pipe 17 to pipe 10, thus allowing water to flow through and exert a pressure on the back of the piston 4, compressing the liquid column in casing 5 somewhat; but it cannot simultaneously flow through pipe 11 and exhaust pipe 18 because the connection between them is broken by the solid portion of rotor 13.

As rotor 13 continues to turn, it will next shut off the connection between intake pipe 17 and pipe 10 and shortly thereafter will then connect pipe 11 to discharge pipe 18. When this occurs, the compressional force on the liquid column in casing 5 will be removed, the column will expand, moving piston 4 upward and the displaced water will be discharged through pipes 11 and 18. It will thus be seen if rotor 13 is allowed to revolve it will cause a series of pressure pulses to be delivered to the top of the liquid column at a frequency which is dependent upon the speed of rotation of rotor 13. If now, rotor 13 is revolved at a speed corresponding to the ¼ wavelength frequency of the liquid column in casing 5—in the case of a 1000 foot column as we have seen, about 53.3 r.p.m.—the liquid column in casing 5 will begin to oscillate vertically and will reach an amplitude which is dependent upon the pressure applied to piston 4. As has been mentioned before, when the pulses are applied at the ¼ wavelength frequency of the liquid column in casing 5 the pressures exerted at the bottom of the column may easily be ten times the pressure applied at the top of the piston. The oscillating column, therefore, exerts what might be likened to a rapid series of hammer blows on the formation to be fractured which is much more conducive to satisfactory fracturing than the application of a steady high pressure.

It might be supposed that the energization of the oscillating column might be at least equally, or perhaps better, accomplished by driving it with an eccentric. This is not the case however, without a great deal of complexity, which the above described arrangement was specifically designated to avoid.

An outstanding difficulty which is immediately presented by the use of an eccentrically driven piston is that the stroke is set by the eccentricity of the eccentric. Therefore, when first starting the column in oscillation, it is necessary to have the piston initially exert a force sufficient to compress the column to the full stroke of the piston when the column is oscillating. Such an amount of force could only be attained by the use of a drive on the eccentric enormously larger than would be necessary to keep the column in oscillation at the desired amplitude once such oscillation had been attained, with the result that the motor would be running at very low efficiency. With the arrangement shown in FIGURE 5, however, the pressure pulses applied to the piston at the moment of starting need be no greater than they would be at the desired amplitude of oscillation of the column.

Again, if the operator desires to change the pulsating pressure applied to the formation at the bottom of casing 5, he need only raise or lower the pressure applied via the intake pipe 17 shown in FIGURE 5 and a greater or lesser pulsating pressure is applied at the bottom in conformity therewith. This may be accomplished by conventional means such as a valve control 17a.

With the eccentrically driven piston, however, it is necessary to change the eccentricity of the eccentric to bring about higher or lower peak pressures at the formation which requires a much more elaborate mechanical arrangement than does the method shown in FIGURE 5. Furthermore in the latter case since the rotor would never be revolved at more than about 150 r.p.m. even on very shallow wells, the maintenance and adjustment of the rotor speed is very simple.

Mention has already been made of filling casing 5 with the sand-bearing liquid through opening 6 and check valve 7. Check valve 7 is so arranged that it will permit a flow of liquid through it toward the interior of casing 5 but not in the reverse direction. Therefore, when the oscillating pressure built up at the bottom of the casing becomes great enough to force some of the sand-liquid mixture out into the formation through perforations 19, for instance, the average height of the column will be reduced by this amount and the deficiency can then be made up by the inflow of fresh material through opening 6 and valve 7.

Figure 7:
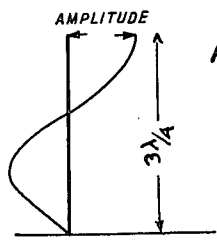
FIGURE 7 shows the application of the present invention to a three-quarter wave length column.

Although mention has so far been made only of operating the liquid column as a ¼ wavelength vibrator, it is also possible to operate it as a ¾ wavelength vibrator and under certain conditions there may be advantages on so doing. FIGURE 7 shows the distribution of amplitude along the length of the column under such conditions. As will be noted, the maximum amplitude again occurs at the top of the column as was the case with the ¼ wavelength operation depicted in FIGURE 2, and a point of minimum amplitude at the bottom, but in addition a point of minimum amplitude also occurs at a point ⅔ of the way up from the bottom. The net effect is as if the length of the column had been reduced by ⅔, thus reducing the amount of motion required at the piston for a given pressure at the bottom.

This can be an important point on deep wells because the stroke at the piston can easily be 40–45 inches for a given pressure at the bottom of a 1000 foot well and would be about double this amount for the same pulsating pressure at the bottom of a 2000 foot well. While the amount of actual motion of the piston can be reduced by having the piston operate in a cylinder at the top of the column which has a larger cross section than casing 5, it will sometimes be found convenient to drive the column at the 3rd, or even the 5th harmonic ¼ wavelength frequency of the column rather than the fundamental or ¼ wavelength frequency, thus reducing the size of the equipment. In the case of the 1000 foot hole illustration discussed above, this would mean pulsating the column at 159.9 times per minute for ¾ wavelength operation, or at 266.5 pulsations per minute in case the 5th harmonic were used.

The term $(1+2n)$ represents a multiple of the quarter wavelength of the liquid column, "$n$" is equal to zero or a whole integer.

As illustrated in FIG. 5, there is secured to piston 4 a vertically oriented shaft. This shaft projects upwardly out of the column. A suitable pointer or marker is secured to the shaft with the pointer adapted to move vertically adjacent a scale so that an operator will be able to determine the displacement of piston 4.

Having now described my invention, I claim:

1. A means of increasing the permeability of an underground formation adjacent the bottom of a well casing comprising a fluid column filling said well casing, a piston engaging the top of the fluid column and forming a substantially fluid-tight top closure therefor, means for applying a pulsating pressure to said piston at a frequency equal to the frequency for establishing said fluid as a resonant column in which said column has a length equal to a quarter wave length or low odd whole integer multiple thereof whereby said column becomes resonant with an amplitude antinode and pressure node at the top, means for passing a small portion of said fluid from the base of the well casing whereby the formation at the base of the column becomes more permeable, and means for resupplying fluid to said fluid column.

2. A method of increasing the permeability of an underground formation adjacent the bottom of a well casing for the flow of liquids into the well casing from such formation which comprises filling the well casing with a fluid to establish a fluid column, applying intermittent pressure at the top of said fluid column for establishing said column as a resonant column having standing waves longitudinal of the casing having a frequency equal to the frequency at which said column has a length of one-quarter of a wave length or half wave length additions thereof with a pressure nodal point and an amplitude antinodal point at the top of said column for greatly amplifying the pressure at the base of said column compared to the pressure at the top of the said column whereby the permeability of the formation in the vicinity of the base of said column will be greatly increased for the flow of liquids therethrough.

3. A method of increasing the permeability of an underground formation adjacent a well casing for the flow of fluid into the well casing from such formation which comprises filling the well casing with a fluid containing sand, impressing high pulsating hydrostatic pressure periodically on said fluid to establish the length of said fluid as a substantial resonant structure having standing waves of one quarter of a wavelength with maximum amplitude and minimum pressure at the top of said structure, whereby the fluid pressure at the base of the said structure is substantially greater than at the top of said structure and whereby the formation in the vicinity of the base of said structure will be penetrated by said fluid and sand and the permeability of the formation will be greatly increased for the flow of liquids therethrough.

4. A method of increasing the permeability of an underground formation adjacent a well casing for the flow of liquids into said well casing from said formation which comprises filling said well casing with a fluid column containing sand, alternately applying pressure and then allowing free expansion at the top of said fluid column, thereby creating high pulsating pressures in said column with said pressure applied at a frequency to establish the column as a substantial resonant structure in which the column has a length equal to $\lambda/4\ (1+2n)$ where $\lambda$ is the wave length of the compressional wave applied to the column and $n$ is equal to zero or a whole integer and with an amplitude antinode and pressure node at the top thereof, whereby the pressure at the base of the column will be substantially greater than at the top of the column and whereby the permeability of the formation in the vicinity of the base of the column will be greatly increased for the flow of liquid therethrough.

5. Means for increasing the permeability of an underground formation at the bottom of a well column for the flow of liquids into said well column, comprising means for maintaining said well column filled with a fluid medium, a piston engaging the top of the fluid column, a source of alternating fluid pressure applied to said piston to apply compressional wave pulses at the top of said fluid column at a frequency establishing said fluid column as as resonant column in which the column has a length substantially equal to $\lambda/4\ (1+2n)$ where $\lambda$ is the wave length of the compressional wave applied to the column and $n$ is equal to zero or a whole integer whereby the formation of the base of the column becomes more permeable to the flow of liquid into the well.

6. Means for increasing the permeability of an underground formation at the bottom of a well column for the flow of liquids into said well column, comprising means for maintaining said well column filled with a fluid medium, a freely movable piston in said column having its lower surface engaging the top of said fluid medium, means providing a source of intermittent fluid pressure applied to the opposite surface of said piston, comprising an input line and exhaust line and valve for first connecting said input line and then said exhaust to said column to apply compressional wave pulses at the top of said column at a frequency establishing said column as a resonant column in which the column has a length substantially equal to $\lambda/4 (1+2n)$ where $\lambda$ is the wave length of the compressional wave applied to the column and n is equal to zero or a whole integer whereby the formation at the base of the column becomes more permeable to the flow of liquid into the well.

7. A method of increasing the permeability of an underground formation adjacent the bottom of a well casing for the flow of liquids into the well casing from such formation which comprises filling the well casing with a fluid column, impressing from the top of said column compressional forces for establishing said column as a resonant column having standing waves longitudinal of the column at a frequency corresponding to a one-quarter wave length, or half wave length additions thereof and establishing unrestrained longitudinal oscillation of said fluid column at its natural one-quarter wave length period or half wave additions thereof with maximum movement and minimum pressure of said fluid at the top of said column.

8. A means as set forth in claim 5 wherein a vertically oriented shaft is secured at one end to said piston with said shaft projecting out of said column, and means associated with said shaft for indicating relative vertical movement of said shaft.

9. Means for increasing the permeability of an underground formation at the bottom of a well casing for the flow of liquids into said well casing comprising means for maintaining said well casing filled with a fluid column, means for applying compressional wave pulses at the top of said column at a frequency equal to the frequency for establishing said column as a resonant column in which the column has a length equal to $\lambda/4 (1+2n)$ where $\lambda$ is the wave length of the compressional wave applied to the column and n is equal to zero or a whole integer whereby said column becomes resonant with an amplitude antinode and pressure node at the top of said column and the base of said column becomes more permeable to the flow of liquid into said column.

References Cited in the file of this patent

UNITED STATES PATENTS

| | | |
|---|---|---|
| Re.23,381 | Bodine | June 26, 1951 |
| Re.23,733 | Farris | Nov. 10, 1953 |
| 941,409 | Ehrhart | Nov. 30, 1909 |
| 2,304,793 | Bodine | Dec. 15, 1942 |
| 2,350,212 | Bodine | May 30, 1944 |
| 2,554,005 | Bodine | May 22, 1951 |
| 2,680,485 | Bodine | June 8, 1954 |
| 2,700,422 | Bodine | Jan. 25, 1955 |
| 2,866,509 | Brandon | Dec. 30, 1958 |
| 2,871,943 | Bodine | Feb. 3, 1959 |